United States Patent
Boyce et al.

(10) Patent No.: US 11,310,142 B1
(45) Date of Patent: Apr. 19, 2022

(54) SYSTEMS AND METHODS FOR DETECTING NETWORK ATTACKS

(71) Applicant: Trend Micro Incorporated, Tokyo (JP)

(72) Inventors: Kevin G. Boyce, Ottawa (CA); Troy W. Tuttle, Arnprior (CA)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 17/239,324

(22) Filed: Apr. 23, 2021

(51) Int. Cl.
*H04L 43/18* (2022.01)
*H04L 69/18* (2022.01)
*H04L 29/06* (2006.01)

(52) U.S. Cl.
CPC ............ *H04L 43/18* (2013.01); *H04L 63/123* (2013.01); *H04L 63/1441* (2013.01); *H04L 69/18* (2013.01)

(58) Field of Classification Search
CPC ... H04L 43/18; H04L 63/123; H04L 63/1441; H04L 63/18
USPC ......................................................... 709/224
See application file for complete search history.

(56) References Cited

U.S. PATENT DOCUMENTS

| | | | | |
|---|---|---|---|---|
| 11,196,555 | B1* | 12/2021 | Mouraveiko | H04L 69/22 |
| 2012/0089626 | A1* | 4/2012 | Goranson | G06F 16/68 |
| | | | | 707/756 |
| 2015/0319030 | A1* | 11/2015 | Nachum | H04L 43/00 |
| | | | | 370/250 |
| 2016/0191549 | A1* | 6/2016 | Nguyen | H04L 63/1425 |
| | | | | 726/23 |
| 2016/0306832 | A1* | 10/2016 | Hegde | G06F 16/22 |
| 2017/0085512 | A1* | 3/2017 | Bray | H04L 51/22 |
| 2020/0287920 | A1* | 9/2020 | Mandrychenko | H04L 67/2828 |

OTHER PUBLICATIONS

Intrusion detection system—Wikipedia, 13 sheets [retrieved on Aug. 11, 2021], retrieved from the internet https://en.wikipedia.org/wiki/Intrusion_detection_system.
Snort 3 is available! Snort—Network Detection & Prevention System, 9 sheets [retrieved on Aug. 11, 2021], retrieved from the internet: https://www.snort.org.
Suricata (software)—Wikipedia, 3 sheets [retrieved on Aug. 11, 2021], retrieved from the internet https://en.wikipedia.org/wiki/Suricata_(software).
Community Driven. Always Alert. Home—Suricata, 5 sheets [retrieved on Aug. 11, 2021], retrieved from the internet https://suricata.io.
Zeek—Wikipedia, 2 sheets [retrieved on Aug. 11, 2021], retrieved from the internet: https://en.wikipedia.org/wiki/zeek.

* cited by examiner

*Primary Examiner* — James E Springer
(74) *Attorney, Agent, or Firm* — Patrick D. Benedicto

(57) ABSTRACT

Network attacks are detected by a protocol engine that works in conjunction with one or more streaming protocol analyzers. The protocol engine receives network packets over a computer network and generates metadata of the network packets. The metadata are placed in a transport envelope, which is streamed over the computer network. The transport envelope is received over the computer network. After receiving the transport envelope over the computer network, the metadata are extracted from the transport envelope and provided to the one or more streaming protocol analyzers, which analyze the metadata to detect network attacks.

22 Claims, 7 Drawing Sheets

SYSTEMS AND METHODS FOR DETECTING NETWORK ATTACKS

BACKGROUND OF THE INVENTION

1. Field of the Invention

The present invention is directed to computer network security.

2. Description of the Background Art

Intrusion Detection and Prevention Systems (IDPSs) have been developed to monitor and analyze network traffic to detect network attacks, such as unauthorized intrusion, communications with malicious sites on the Internet, and other malicious traffic. Examples of IDPSs include SNORT, SURICATA, and ZEEK network analysis software. An IDPS typically includes an engine and patterns that run on the same host. The engine performs some level of network protocol decoding. The output of the engine is matched against the patterns, which may include rules, signatures, or both to detect network attacks.

SUMMARY

In one embodiment, network attacks are detected by a protocol engine that works in conjunction with one or more streaming protocol analyzers. The protocol engine receives network packets over a computer network and generates metadata of the network packets. The metadata are placed in a transport envelope, which is streamed over the computer network. The transport envelope is received over the computer network. After receiving the transport envelope over the computer network, the metadata are extracted from the transport envelope and provided to the one or more streaming protocol analyzers, which analyze the metadata to detect network attacks.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
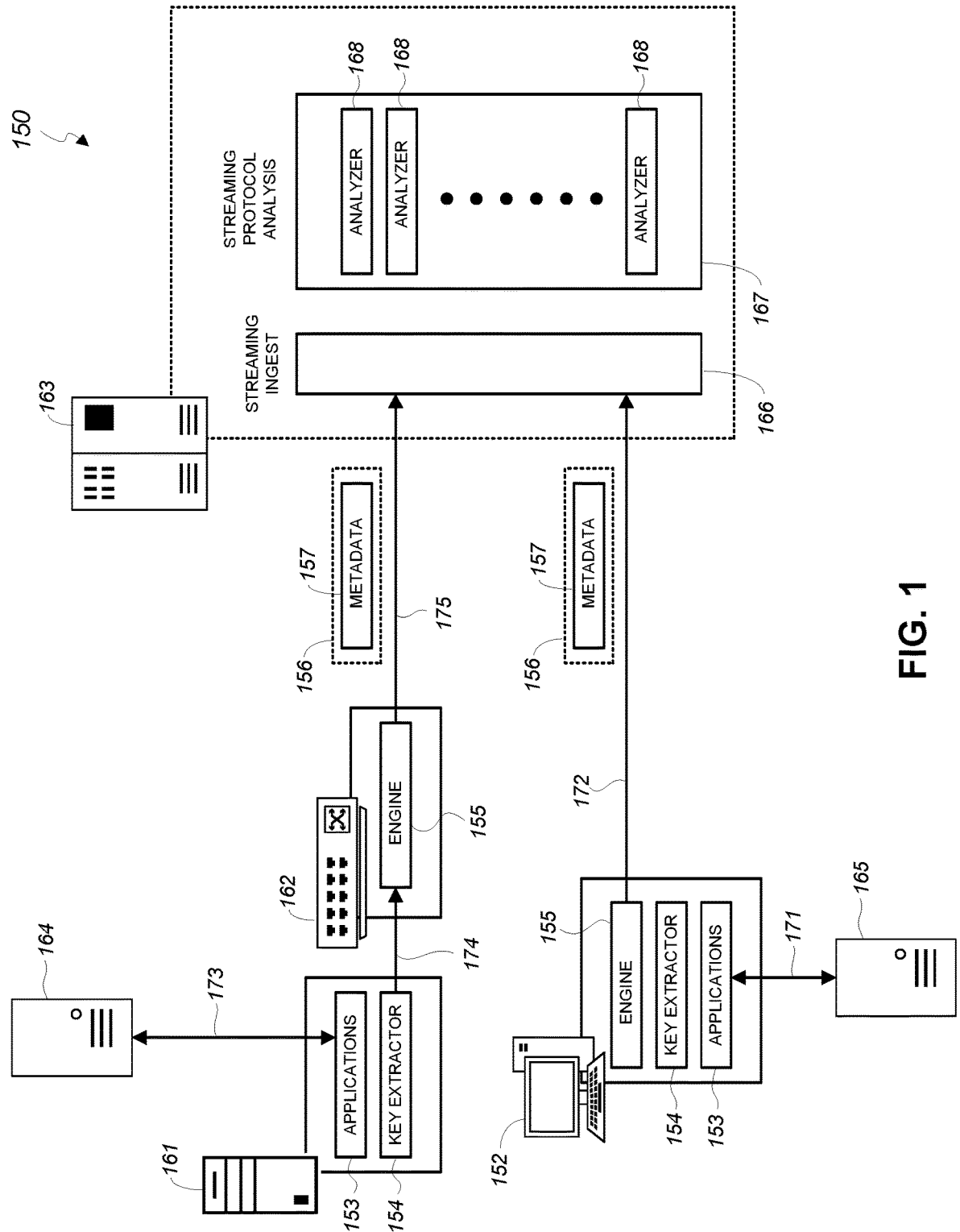
FIG. 1 shows a logical diagram of a computer network in accordance with an embodiment of the present invention.

FIG. 1 shows a logical diagram of a computer network 150 in accordance with an embodiment of the present invention. In the example of FIG. 1, an IDPS includes a protocol engine 155 that works in conjunction with one or more streaming protocol analyzers 168. The protocol engine 155 and the streaming protocol analyzers 168 run on separate host computing devices that communicate over the computer network.

A protocol engine 155 is configured to receive network packets and generate metadata 157 of the network packets. The metadata 157 may include annotation, flow, and/or protocol metadata of the network packets. The protocol engine 155 is configured to place the metadata 157 into a transport envelope 156 and stream the transport envelope 156 over the computer network to a backend system 163 for processing in conjunction with one or more streaming protocol analyzers 168.

In one embodiment, the protocol engine 155 encodes the metadata 157 into an encoded binary form that closely represents the wire form but with redundant fields removed, such as by linear binary encoding (e.g., using the Google Flatbuffers™ library). Optionally, the encoded metadata 157 are compressed (e.g., using the LZ4 streaming compression algorithm) and then placed in a transport envelope 156, which is marked with a shard key. The above encoding and compression procedures minimize the impact of streaming the metadata 157 over the computer network for analysis in the backend system 163. The transport envelope 156 is thereafter streamed over a TCP connection, for example, to the backend system 163.

The backend system 163 may comprise a distributed computing system, a server computer, a cloud computing infrastructure, or other computing platform. The backend system 163 may be configured to receive transport envelopes 156 containing metadata 157 from one or more monitoring hosts that run a protocol engine 155. The backend system 163 includes a streaming ingest function (see block 166) that receives a transport envelope 156, extracts the metadata 157 from the transport envelope 156, and distribute the metadata 157 into one or more shards. The backend system 163 may perform streaming protocol analysis (see block 167) of the metadata 157 by forwarding sharded metadata 157 to one or more streaming protocol analyzers 168 that are subscribed to receive the sharded metadata 157. The decompression and decoding of the sharded metadata 157 may be performed by a protocol analyzer 168 or another module prior to protocol analysis. As can be appreciated, the functionality of the backend system 163 may be distributed among a plurality of computing devices.

A streaming protocol analyzer 168 may comprise rules, signatures, machine learning models, and/or other modules for detecting network attacks. A streaming protocol analyzer 168 may be configured to detect network attacks, including Web exploits, malicious behavior, malicious payloads, unauthorized intrusion, communications with malicious sites on the Internet, and/or other malicious traffic. A streaming protocol analyzer 168 may detect network attacks from metadata 157 generated by a protocol engine 155 using a suitable conventional network attack detection module or algorithm without detracting from the merits of the present invention.

A protocol engine 155 may work in conjunction with a key extractor 154 to decrypt encrypted network traffic. The key extractor 154 may be configured to obtain an encryption key that is employed to encrypt network traffic transmitted between two endpoint computers. Examples of key extraction algorithms that may be employed by the key extractor 154 include the so-called shared library interposition; kernel/operating system library hooking; and memory scraping.

For example, an endpoint computer 152 may be hosting one or more application programs 153, a key extractor 154, and a protocol engine 155. An application program 153 may comprise client software (e.g., web browser, email client) that is in communication with server software (e.g., website, email service) that is running on an endpoint computer 165 (see arrow 171).

In the example of FIG. 1, a Transmission Control Protocol (TCP) connection has been established between the endpoint computers 152 and 165. The endpoint computers 152 and 165 negotiate to use a session key in accordance with the Transport Layer Security (TLS) protocol to encrypt network traffic transmitted between them. In the endpoint computer 152, the key extractor 154 is configured to obtain the session key and provide the session key to the protocol engine 155. The protocol engine 155 monitors and receives encrypted network traffic transmitted between the endpoint computers 152 and 165, decrypts the encrypted network traffic using the session key, generates metadata 157 of the decrypted network traffic, and streams a transport envelope 156 that includes the metadata 157 to the backend system 163 (see arrow 172).

The protocol engine 155 does not necessarily have to run on the same host as the key extractor 154. For example, in the example of FIG. 1, an endpoint computer 161 is running an application program 153 that is in communication with another program that is running on an endpoint computer 164 (see arrow 173). The endpoint computers 161 and 164 encrypt their network traffic using a session key in accordance with the TLS protocol. The key extractor 154 running on the endpoint computer 161 obtains the session key, and forwards to a network device 162 (see arrow 174) the session key and the encrypted network traffic that is transmitted between the endpoint computers 161 and 164. A protocol engine 155 hosted by the network device 162 decrypts the encrypted network traffic using the session key, generates metadata 157 of the decrypted network traffic, and streams a transport envelope 156 that includes the metadata 157 to the backend system 163 (see arrow 175).

Generally speaking, an endpoint computer or network device may comprise a desktop computer, a server computer, mobile computer, security appliance, gateway, or other computing device (i.e., hardware). As can be appreciated, the functionality of an endpoint computer or network device as described herein may also be implemented by a virtual computer, virtual machine, or other virtualization platform. For example, in some embodiments, the aforementioned components are implemented as part of a virtual private cloud, Software-defined Networking (SDN), or some other computing architecture or topology.

In one embodiment, a key extractor 154, a protocol engine 155, a streaming protocol analyzer 168, and the general functionality of the backend system 163 are implemented in software. Instructions of such software components may be stored in memory for execution by at least one processor. As can be appreciated, one or more components described herein may also be implemented in hardware (e.g., field programmable gate array (FPGA), programmable logic device) or augmented by hardware-acceleration.

Figure 2:
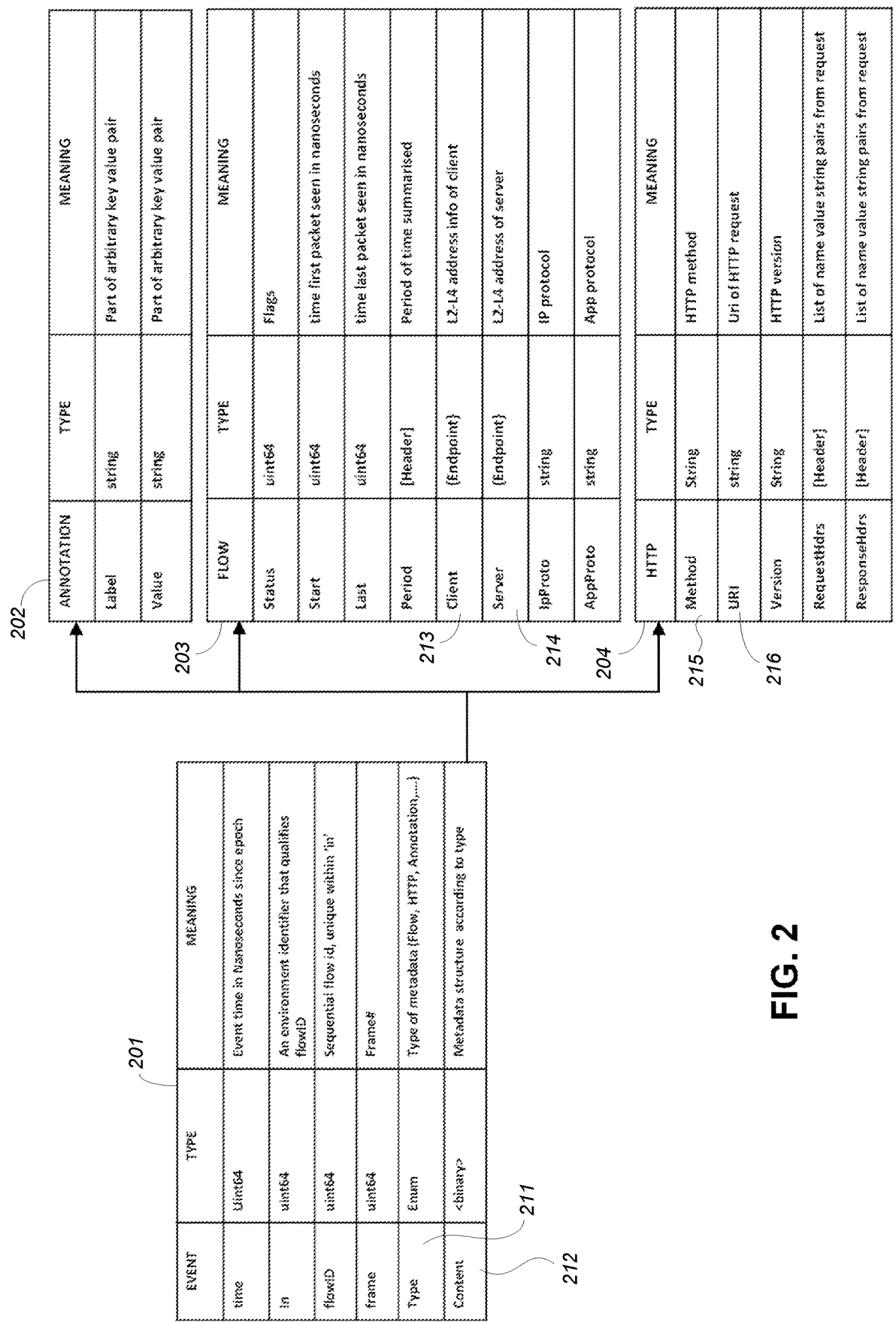
FIG. 2 shows example metadata that may be generated by a protocol engine in accordance with an embodiment of the present invention.

FIG. 2 shows example metadata that may be generated by a protocol engine 155 in accordance with an embodiment of the present invention. The metadata of FIG. 2 are provided for illustration purposes only. As can be appreciated, metadata generated by a protocol engine may be varied depending on the particulars of the cybersecurity application. The metadata of FIG. 2 are self-explanatory. Accordingly, only some of the metadata are discussed below.

In the example of FIG. 2, metadata of collected network packets originated by a particular pair of source and destination endpoints are streamed as a metadata record, which is also simply referred to herein as a "record". In the example of FIG. 2, a metadata record may carry an annotation metadata (see Table 202), a flow metadata (see Table 203), or a protocol metadata (see Table 204). Protocol metadata may be for a layer 2, layer 4, layer 5, layer 6, or layer 7 protocol. The example of FIG. 2 shows protocol metadata for the Hypertext Transfer Protocol (HTTP). As can be appreciated, protocol metadata may also be generated for other layer 2 to layer 7 protocols.

Each metadata record may have time information ("time"), environment identifier ("In"), flow ID ("flowID"), frame no. ("frame"), metadata type ("Type"; annotation, flow, or protocol metadata), and content information ("Content") (see FIG. 2, Table 201).

The type information (see FIG. 2, 211) of a metadata record indicates the type of the metadata represented by the record, whereas the content information (see FIG. 2, 212) indicates the structure of the metadata according to the type. The annotation metadata (see Table 202) indicate a key-value pair that identifies the source of the network packets, such as the computer network where the network packets are collected and/or the instance of the protocol engine that collected and streamed the metadata record. The instance of the protocol engine may be an identifier of the protocol engine or identifier of the host running the protocol engine. The key-value pair may also be used as a shard key for distributing the metadata into one or more shards in the backend system 163.

The flow metadata (see Table 203) indicate flow information of the collected network packets. The flow metadata may indicate, among other flow information, the data link layer (layer 2), network layer (layer 3), and/or transport layer (layer 4) address information of the two endpoints (e.g., client and server; see FIGS. 2, 213 and 214) that are transmitting the network packets.

In the example of FIG. 2, the protocol metadata (see Table 204) are for HTTP. For HTTP, the protocol metadata include the HTTP method (see FIG. 2, 215) and Uniform Resource Identifier (URI; see FIG. 2, 216) indicated in the collected network packets.

Figure 3:
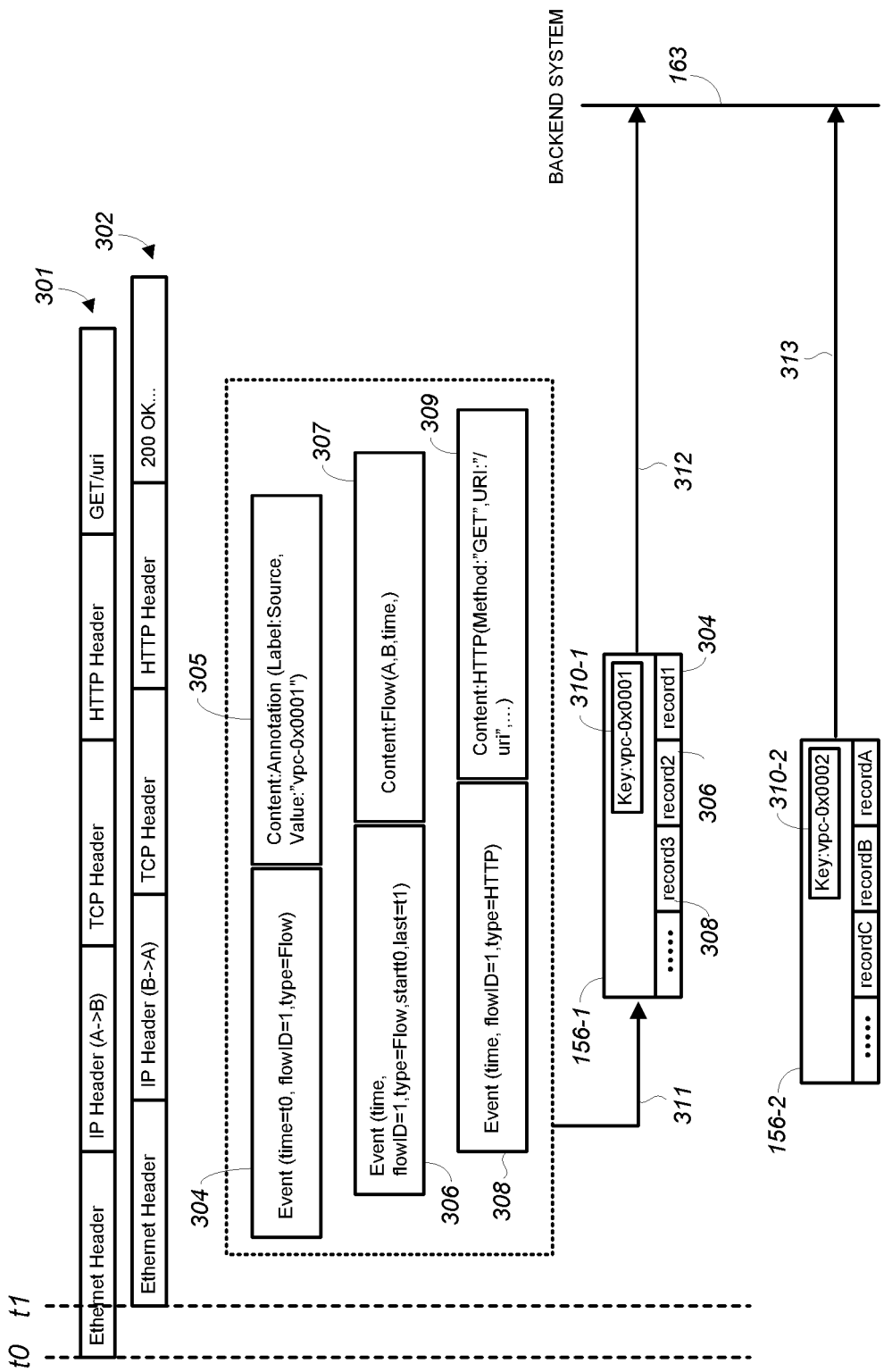
FIG. 3 shows an example operation of a protocol engine in accordance with an embodiment of the present invention.

FIG. 3 shows an example operation of a protocol engine 155 in accordance with an embodiment of the present invention. In the example of FIG. 3, a network traffic 301 comprises network packets transmitted by a first endpoint ("A") to a second endpoint ("B") to request data (HTTP GET method) from a particular URI. The network traffic 302 comprises network packets transmitted by the second endpoint ("B") to the first endpoint ("A") to provide the requested data ("200 OK").

Using the network traffic 301 for illustration, the protocol engine 155 receives and collects the network packets of the network traffic 301 over a computer network. The protocol engine 155 may decrypt encrypted portions of the network packets, such as the HTTP header and HTTP method, as previously described. The protocol engine 155 detects and decodes the protocol of the network packets, which in this example is HTTP.

The protocol engine 155 may generate a metadata record 304 with annotation metadata (see content 305) that indicate a shard key and/or source of the network packets, such as the computer network where the network packets are collected and/or the instance of the protocol engine that collected the network packets. In the example of FIG. 3, the network packets are collected by a protocol engine 155 hosted in a virtual private cloud (VPC) identified as "vpc-0x0001" (see content 305).

The protocol engine 155 may generate a metadata record 306 with flow metadata (see content 307) for the network flow if one has not been generated already and assign a flowID for the network flow if necessary. The protocol engine 155 may generate a metadata record 308 with protocol metadata (see content 309), which in this example are application-layer metadata. The protocol engine 155 may redact and/or anonymize the application-layer metadata depending on privacy requirements. In the example of FIG. 3, the protocol metadata (see content 309) indicate the HTTP method and URI included in the collected network packets.

The protocol engine 155 may encode each of the metadata records 304, 306, and 308 by linear binary encoding and place them in a transport envelope 156-1 (see arrow 311). In general, a plurality of metadata records may be placed in a single transport envelope. Optionally, the protocol engine 155 may employ a stream compression algorithm (e.g., the LZ4 stream compression algorithm) to compress the metadata records 304, 306, and 308 and place them in the transport envelope 156-1. The protocol engine 155 marks the transport envelope 156-1 with a shard key 310-1, which is associated with the metadata records 304, 306, and 308. A transport envelope may have the form:

Transport envelope::=<header> <[compressed] list of encoded metadata records>
Header::=<shard key>

That is, a transport envelope may have a plurality of compressed and encoded metadata records, with the metadata records sharing the same header, which in this example is the shard key.

The protocol engine 155 streams the transport envelope 156-1 to be ingested by the backend system 163 (see arrow 312). The protocol engine 155 may stream transport envelopes to the backend system 163 periodically (e.g., every 10 ms) or when certain conditions are satisfied, such as when the transport envelope exceeds a predetermined size threshold.

A similar procedure is performed by other protocol engines to stream a transport envelope 156-2 containing metadata of network packets to the backend system 163 (see arrow 313). In the example of FIG. 3, the transport envelope 156-2 contains metadata of network packets collected in a virtual private cloud identified as "vpc-0x0002" (see shard key 310-2).

Figure 4:
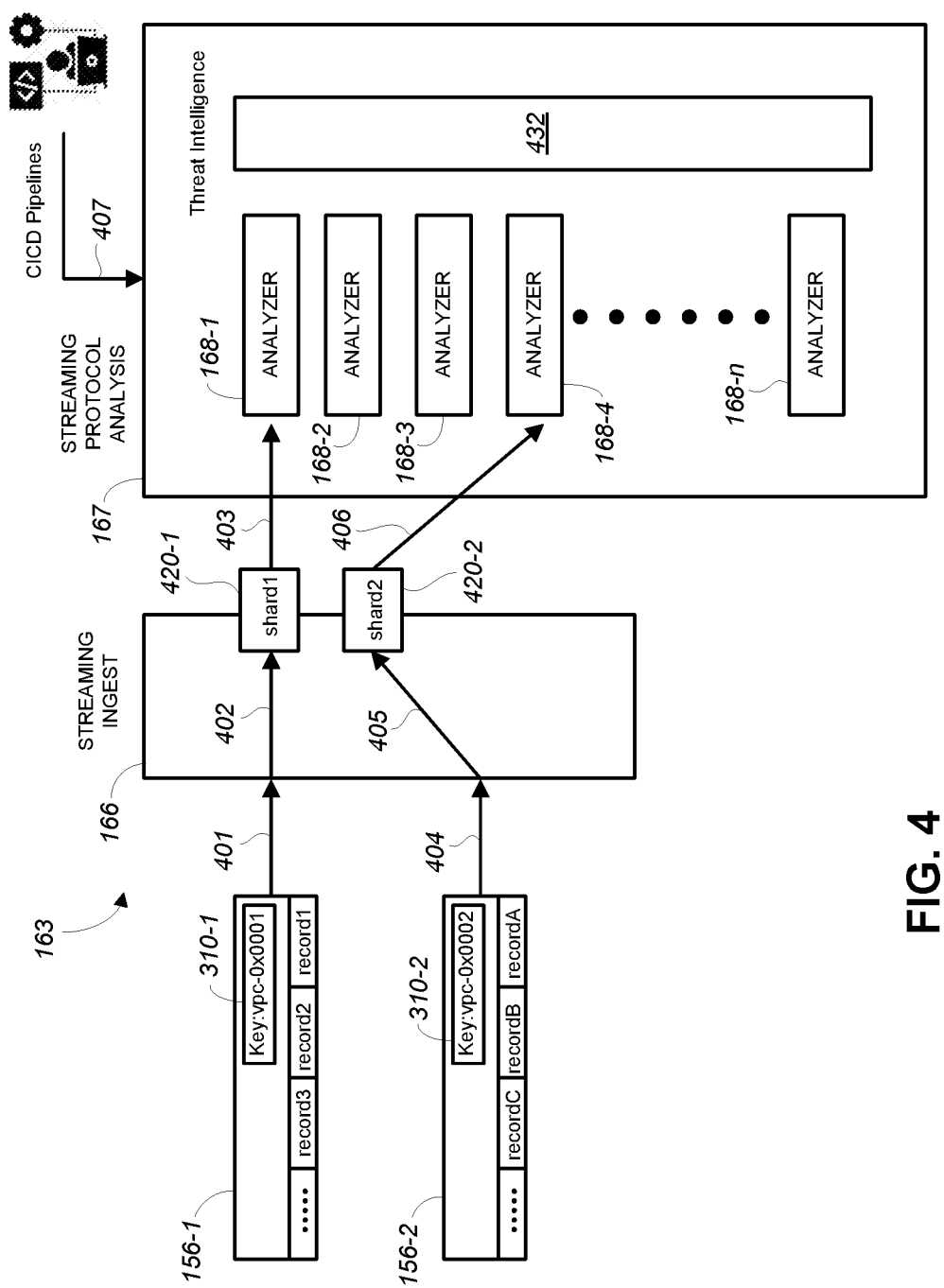
FIG. 4 shows an example operation of a backend system in accordance with an embodiment of the present invention.

FIG. 4 shows an example operation of the backend system 163 in accordance with an embodiment of the present invention. The example operation of FIG. 4 follows FIG. 3, when streamed transport envelopes arrive in the backend system 163.

In the example of FIG. 4, the transport envelope 156-1 is ingested in the backend system 163 (see arrow 401) by a streaming ingest function (see block 166). The streaming ingest function may be implemented using the Kafka Streams, Apache Pulsar or Amazon Kinesis streaming ingest, for example. The streaming ingest function receives the transport envelope 156-1, extracts the metadata from the transport envelope 156-1, and distributes the metadata into shards in accordance with their shard keys (see arrow 402). A shard is a collection of metadata and serves as a distribution point for the metadata. The decompression and decoding of the metadata may be performed by the ingest function, by a streaming protocol analyzer 168, or by other module before the metadata are analyzed to detect network attacks.

In one embodiment, metadata from different sources may be mapped into the same or different shards; however metadata with the same shard key are always mapped to the same shard. In the example of FIG. 2, metadata from a transport enveloped marked with a shard key "vpx-0x0001" are mapped to shard 420-1 (see arrow 402) and metadata from a transport enveloped marked with a shard key "vpc-0x0002" are mapped to shard 420-2 (see arrow 405).

The streaming protocol analysis function (see block 167) of the backend system 163 includes a plurality of streaming protocol analyzers 168 (i.e., 168-1, 168-2, etc.). Each streaming protocol analyzer 168 may be subscribed to receive metadata from particular shards. Streaming protocol analyzers 168 may be subscribed to receive metadata in a collaborative way to ensure that a streaming protocol analyzer 168-1 will see all metadata from a group of shards in order, whereas streaming protocol analyzers 168-2 to 168-n may receive metadata from different non-overlapping subsets of shards. In the example of FIG. 4, the streaming protocol analyzer 168-1 is subscribed to receive metadata distributed to a shard 420-1 (see arrow 403).

The transport envelope 156-2 is ingested by the backend system 163 in similar fashion. More particularly, the backend system 163 receives the transport envelope 156-2 (see arrow 404), extracts the metadata from the transport envelope 156-2, and distributes the metadata into shards according to their shard keys (see arrow 405). The decompression and decoding of the metadata may be performed before protocol analysis, for example by the ingest function or by a streaming protocol analyzer 168. In the example of FIG. 4, the metadata of the transport envelope 156-2 are distributed to the shard 420-2 in accordance with the shard key 310-2 (see arrow 405). The streaming protocol analyzer 168-4 receives the metadata of the transport envelope 156-2 by being subscribed to receive metadata from the shard 420-2 (see arrow 406).

A streaming protocol analyzer 168 analyzes received metadata to detect network attacks. In the example of FIG. 4, the streaming protocol analysis function of the backend system 163 includes threat intelligence 432 for detecting network attacks based on metadata of network packets.

As particular example, protocol metadata generated by a protocol engine may indicate an HTTP method with the following URI (e.g., see FIG. 2, 216):
/?a=1+union/*&b=*/select+1,2  /?a=1+union/*&b=*/select+1, pass/*&c=*/from+users- The URI, which is indicative of a SQL injection attack, translates to:
select * from table where a=1 union/* and b=*/select 1,2
select * from table where a=1 union/* and b=*/select 1, pass/* limit */from users- A streaming protocol analyzer 168 that is subscribed to receive metadata from a shard where the protocol metadata is distributed will examine the URI for evasive content, for example with a simple regex match for the content "/\*.+\*/" or one of many well known techniques. On detection of the metadata pattern, which indicates SQL injection, the streaming protocol analyzer 168 may also use heuristic scoring along with other observations or machine learning techniques, such as random forest decision trees, to determine if an alert or action should be initiated.

One or more corrective actions may be performed in response to detecting a network attack. The corrective actions may be performed by the host of the protocol engine, by the backend system, or by other computing device. Examples of corrective actions include raising an alert, blocking network packets associated with the network attack, blocking all communications with endpoints that are targeted by the network attack, etc.

By running the protocol engine and the streaming protocol analyzers on different hosts, the streaming protocol analyzers may be updated and tuned with no or minimal impact to the protocol engines. This advantageously allows Continuous Integration and Continuous Delivery (CICD) pipelines (see arrow 407) to update the streaming protocol analyzers as new or evolved cyber threats are detected without having to stop and update the protocol engines. The streaming protocol analyzers are no longer limited by the capabilities of the protocol engines or the hosts of the protocol engines. Decoupling the protocol engine from the streaming protocol analyzers allows the protocol engine to be deployed independent of the streaming protocol analyzers. This allows the protocol engine to be deployed in different environments where it would be difficult to execute the streaming protocol analyzers.

Separating the protocol engine from the streaming protocol analyzer also allows each of the protocol engine and the streaming protocol analyzer to be specifically tailored to their respective hosts. Instead of the streaming protocol analyzers being distributed to individual hosts, the streaming protocol analyzers may be managed centrally. The memory and computational burden on the host where the protocol engine executes are no longer a function of the size of the streaming protocol analyzers. Furthermore, the protocol engines are relieved of certain features that were required to support the streaming protocol analyzers. Since the streaming protocol analyzers are not distributed to the protocol engines, the streaming protocol analyzers (with their threat intelligence) are not exposed to reverse engineering and users can be protected against emerging threats much sooner.

In embodiments of the present invention, instead of performing streaming protocol analysis with or on the protocol engine on the same host, the protocol engine is lightweight in that it has the simpler task of generating metadata of the network packets and sending the metadata to the backend system, instead of analyzing the metadata on the same host as the protocol engine.

Application layer protocols are commonly specific to the host's environment. For example, in cloud environments, HTTP traffic typically predominates whereas specialized protocols are used in industrial control systems. The protocol engine can be optimized (e.g. by specialized build or plug-in approach) for different use cases with no or minimal dependencies on the streaming protocol analyzers.

Figure 5:
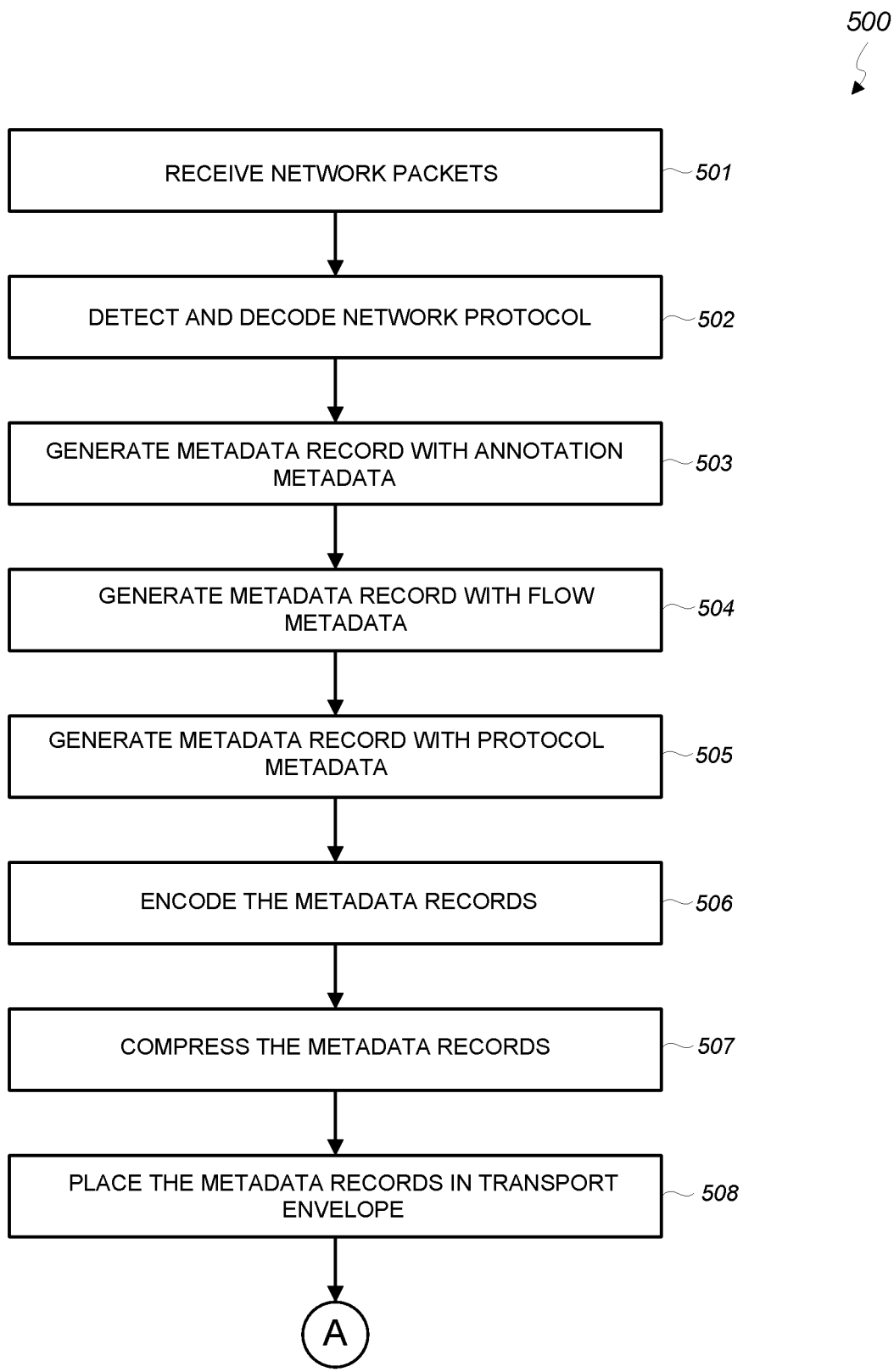
FIGS. 5 and 6 show a flow diagram of a method of detecting network attacks in accordance with an embodiment of the present invention.
Figure 6:
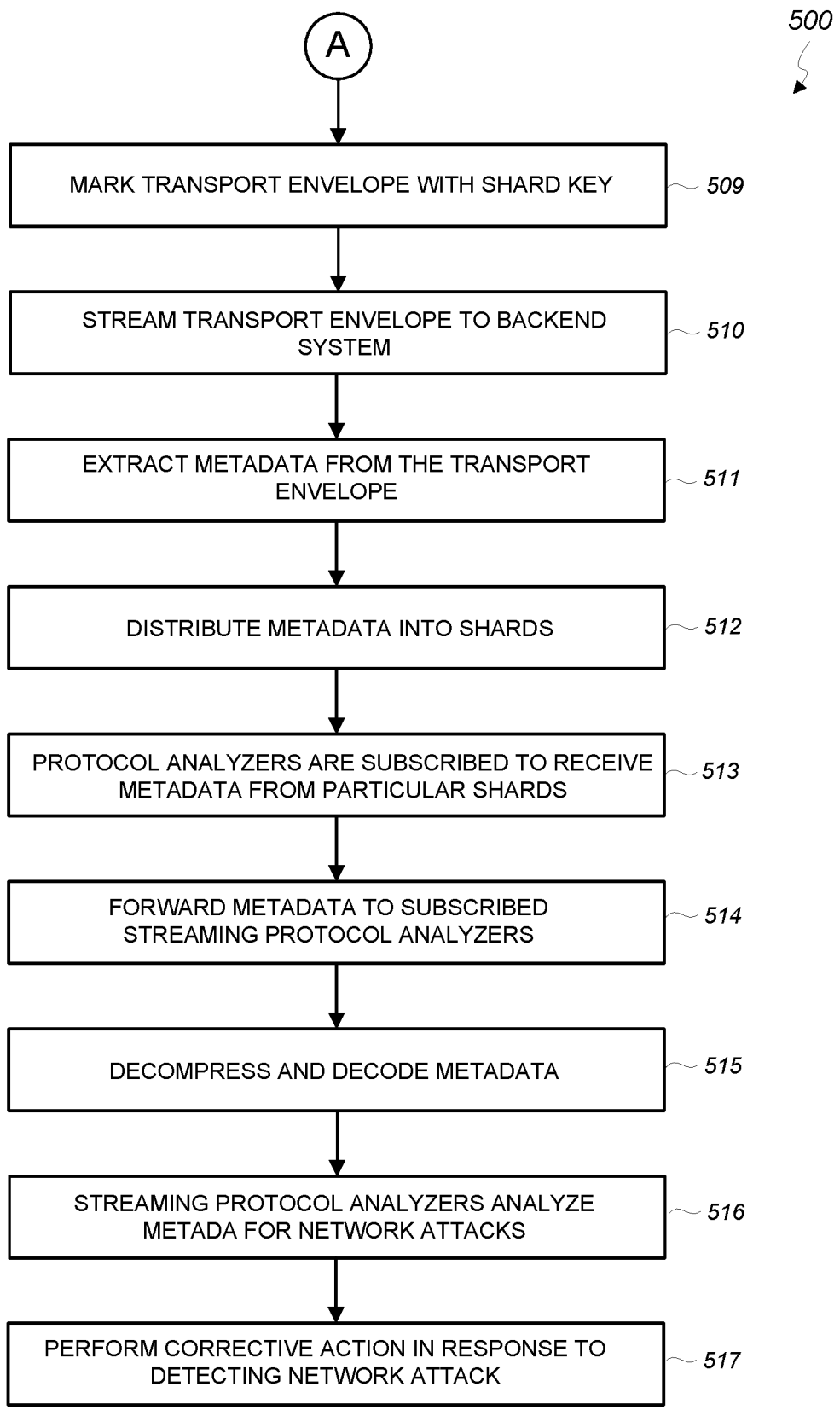

FIGS. 5 and 6 show a flow diagram of a method 500 of detecting network attacks in accordance with an embodiment of the present invention. The method 500 may be performed using previously-discussed components. As can be appreciated, the method 500 may also be performed using other components without detracting from the merits of the present invention.

In step 501, network packets of network traffic are received over a computer network. The network packets may be collected and received by a protocol engine running on a host computing device on the computer network. The host computing device may be inline between two endpoints that are transmitting the network traffic or may be configured to receive the network packets from another computing device.

In step 502, the protocol engine detects and decodes the protocol (e.g., HTTP) of the network packets.

In step 503, the protocol engine generates a metadata record with annotation metadata that indicate the source of the network packets, such as the computer network where the network packets are collected and/or the instance of the protocol engine that collected the network packets. The annotation metadata may also be used as a shard key for subsequent distribution of the metadata in the backend system.

In step 504, the protocol engine generates a metadata record with flow metadata of the network packets. The flow metadata may include flow-related metadata, such as addresses of the client and the server that are communicating in accordance with HTTP, time when the first network packet was detected, time when the last network packet was detected, the IP protocol, the application protocol, etc.

In step 505, the protocol engine generates a metadata record with protocol metadata, which in one embodiment are application-layer (i.e., layer 7) metadata. For HTTP, the protocol metadata may indicate the HTTP method, URI, HTTP version, etc.

In step 506, the protocol engine encodes the metadata records. Optionally, in step 507, the protocol engine compresses the metadata records. In step 508, the protocol engine places the compressed metadata records in a transport envelope.

Continuing in FIG. 6, in step 509, the protocol engine marks the transport envelope with a shard key, which is associated with each of the metadata records. In step 510, the protocol engine streams the transport envelope to the backend system for streaming ingest.

In step 511, the backend system receives the transport envelope and extracts the metadata of the metadata records from the transport envelope. In step 512, the backend system distributes the metadata into shards.

In step 513, streaming protocol analyzers are subscribed to receive metadata from particular shards. In step 514, metadata are forwarded from shards to streaming protocol analyzers that are subscribed to receive the metadata.

In step 515, the metadata are decompressed and decoded after streaming ingest but before protocol analysis by the streaming protocol analyzers. In step 516, the streaming protocol analyzers analyze received metadata to detect network attacks. In step 517, one or more corrective actions are performed in response to the streaming protocol analyzers detecting a network attack.

Figure 7:
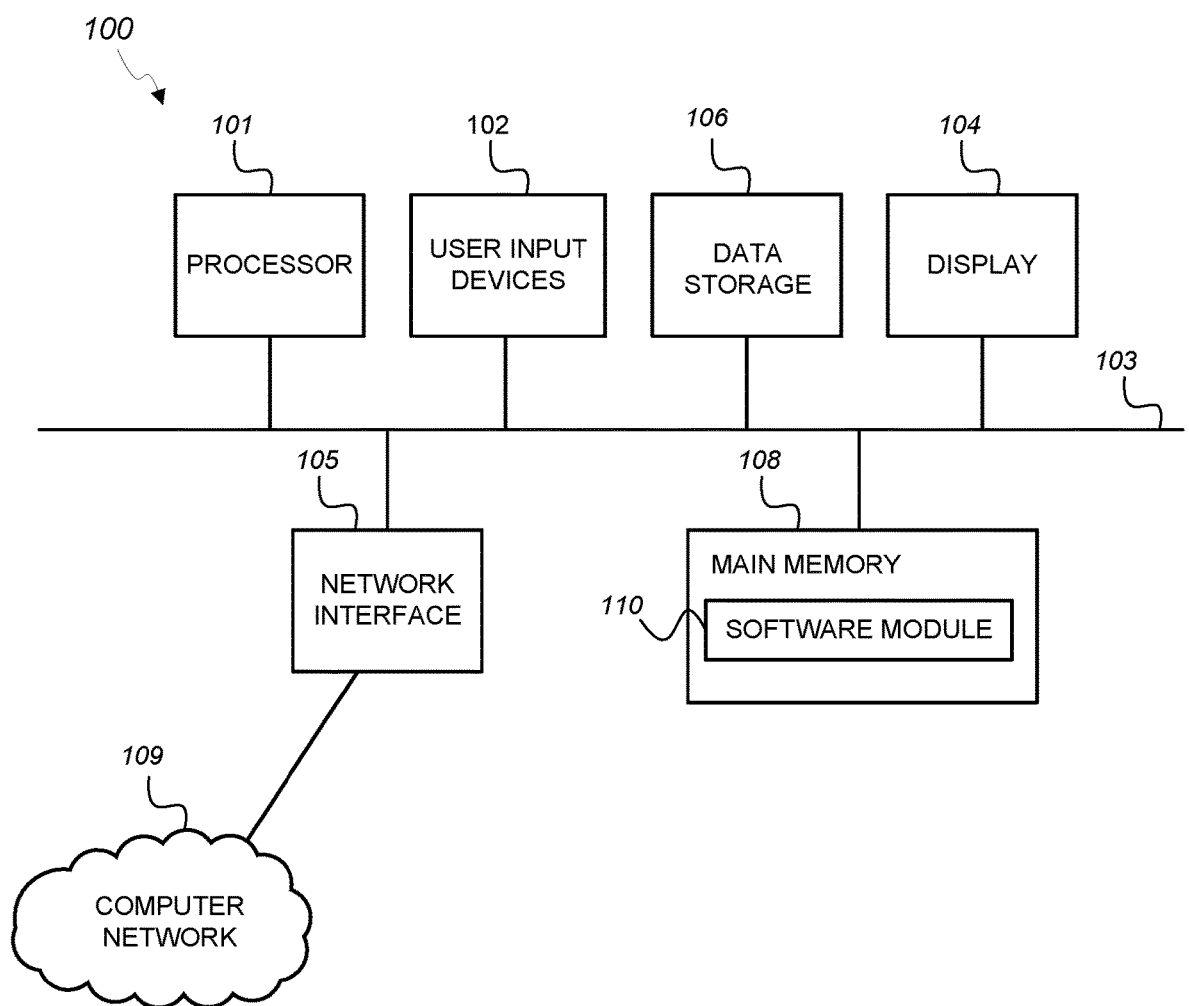
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as a host of a protocol engine, as part of a backend system, or as other computing devices described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured to host a protocol engine, the software modules 110 may comprise the protocol engine and, optionally, a key extractor. In one embodiment where the computer system 100 is configured as part of a backend system, the software modules 110 may comprise modules for performing streaming ingest and streaming protocol analysis.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting network attacks, the method comprising:
    receiving network packets over a computer network;
    after receiving the network packets over the computer network, generating metadata of the network packets from information extracted from the network packets;
    placing the metadata in a transport envelope;
    streaming the transport envelope over the computer network;
    receiving the transport envelope over the computer network;
    after receiving the transport envelope over the computer network, extracting the metadata from the transport envelope; and
    after extracting the metadata from the transport envelope, analyzing the metadata to detect a network attack,
    wherein analyzing the metadata to detect a network attack comprises distributing the metadata into at least one of a plurality of shards and providing the metadata to a streaming protocol analyzer that is subscribed to receive the metadata from a shard of the plurality of shards.

2. The method of claim 1, wherein the metadata indicate a source of the transport envelope.

3. The method of claim 1, wherein the metadata indicate flow information of the network packets.

4. The method of claim 1, wherein the metadata indicate application-layer metadata of the network packets.

5. The method of claim 4, wherein the application-layer metadata of the network packets indicate a Hypertext Transfer Protocol (HTTP) method.

6. A system for detecting network attacks, the system comprising:
    a host computing device comprising a processor and a memory that stores a protocol engine, the protocol engine comprising instructions that when executed by the processor of the host computing device cause the host computing device to:
    receive network packets over a computer network;
    after the network packets have been received over the computer network, generate metadata of the network packets from information extracted from the network packets;
    place the metadata in a transport envelope; and
    stream the transport envelope over the computer network; and
    a backend system comprising at least one processor and a memory, the memory of the backend system storing instructions that when executed by the at least one processor of the backend system cause the backend system to:
    receive the transport envelope over the computer network;
    extract the metadata from the transport envelope; and
    analyze the metadata to detect a network attack,
    wherein the instructions stored in the memory of the backend system, when executed by the at least one processor of the backend system, cause the backend system to: distribute the metadata into at least one of a plurality of shards; and provide the metadata to a streaming protocol analyzer that is subscribed to receive the metadata from a shard of the plurality of shards.

7. The system of claim 6, wherein the metadata indicate a source of the transport envelope.

8. The system of claim 6, wherein the metadata indicate flow information of the network packets.

9. The system of claim 6, wherein the metadata indicate application-layer metadata of the network packets.

10. The system of claim 9, wherein the application-layer metadata of the network packets indicate a Hypertext Transfer Protocol (HTTP) method.

11. A method of detecting network attacks, the method comprising:
    receiving network packets over a computer network;
    after receiving the network packets over the computer network, generating metadata of the network packets from information extracted from the network packets;
    encoding the metadata;
    compressing the encoded metadata;
    placing the compressed metadata in a transport envelope;
    marking the transport envelope with a shard key;
    streaming the transport envelope over the computer network;
    receiving the transport envelope over the computer network;
    after receiving the transport envelope over the computer network, extracting the metadata from the transport envelope; and
    after extracting the metadata from the transport envelope, analyzing the metadata to detect a network attack.

12. The method of claim 11, wherein analyzing the metadata to detect a network attack comprises:
    distributing the metadata into at least one of a plurality of shards according to the shard key; and
    providing the metadata to a streaming protocol analyzer that is subscribed to receive the metadata from a shard of the plurality of shards.

13. The method of claim 11, wherein the metadata indicate a source of the transport envelope.

14. The method of claim 11, wherein the metadata indicate flow information of the network packets.

15. The method of claim 11, wherein the metadata indicate application-layer metadata of the network packets.

16. The method of claim 15, wherein the application-layer metadata of the network packets indicate a Hypertext Transfer Protocol (HTTP) method.

17. A system for detecting network attacks, the system comprising:
- a host computing device comprising a processor and a memory that stores a protocol engine, the protocol engine comprising instructions that when executed by the processor of the host computing device cause the host computing device to:
- receive network packets over a computer network;
- after the network packets have been received over the computer network, generate metadata of the network packets from information extracted from the network packets;
- place the metadata in a transport envelope; and
- stream the transport envelope over the computer network; and
- a backend system comprising at least one processor and a memory, the memory of the backend system storing instructions that when executed by the at least one processor of the backend system cause the backend system to:
- receive the transport envelope over the computer network;
- extract the metadata from the transport envelope; and
- analyze the metadata to detect a network attack,
- wherein the instructions stored in the memory of the host computing device, when executed by the processor of the host computing device, cause the host computing device to:
- encode the metadata;
- compress the encoded metadata;
- place the compressed metadata in the transport envelope;
- mark the transport envelope with a shard key; and
- stream the transport envelope to the backend system over the computer network.

18. The system of claim 17, wherein the instructions stored in the memory of the backend system, when executed by the at least one processor of the backend system, cause the backend system to:
- distribute the metadata into at least one of a plurality of shards according to the shard key; and
- provide the metadata to a streaming protocol analyzer that is subscribed to receive the metadata from a shard of the plurality of shards.

19. The system of claim 17, wherein the metadata indicate a source of the transport envelope.

20. The system of claim 17, wherein the metadata indicate flow information of the network packets.

21. The system of claim 17, wherein the metadata indicate application-layer metadata of the network packets.

22. The system of claim 21, wherein the application-layer metadata of the network packets indicate a Hypertext Transfer Protocol (HTTP) method.

* * * * *